(12) United States Patent
Chen

(10) Patent No.: US 9,227,600 B2
(45) Date of Patent: Jan. 5, 2016

(54) TIRE INFLATOR

(71) Applicant: Tuo-Jen Chen, Taichung (TW)

(72) Inventor: Tuo-Jen Chen, Taichung (TW)

(73) Assignee: WINRiDE INTERNATIONAL CO., LTD., Taichung (TW)

( * ) Notice: Subject to any disclaimer, the term of this patent is extended or adjusted under 35 U.S.C. 154(b) by 132 days.

(21) Appl. No.: 14/205,392

(22) Filed: Mar. 12, 2014

(65) Prior Publication Data

US 2015/0258970 A1    Sep. 17, 2015

(51) Int. Cl.
*B60S 5/04*    (2006.01)

(52) U.S. Cl.
CPC .......................................... *B60S 5/04* (2013.01)

(58) Field of Classification Search
CPC .......................................................... B60S 5/04
USPC ..................................... 141/38; 152/415–416
See application file for complete search history.

(56) References Cited

U.S. PATENT DOCUMENTS

| | | | | |
|---|---|---|---|---|
| 2,925,103 A * | 2/1960 | Kerr | ........................ | B60S 5/043 141/349 |
| 3,329,180 A * | 7/1967 | Van Brocklin | .......... | B60S 5/043 141/349 |
| 3,568,736 A * | 3/1971 | Linch | ........................ | B01J 7/02 137/614.04 |
| 4,185,670 A * | 1/1980 | Sartell, Jr. | ............... | B60S 5/043 116/137 R |
| D278,244 S * | 4/1985 | Boetger | ........................... | D15/7 |
| D304,970 S * | 12/1989 | Gibb | ............................ | D23/231 |
| 5,765,601 A * | 6/1998 | Wells | .................... | B29C 73/163 137/223 |
| 6,382,469 B1 * | 5/2002 | Carter | .................. | B65D 83/205 222/153.06 |
| 6,994,275 B2 * | 2/2006 | Hsiao | .................... | B65D 83/303 239/302 |

* cited by examiner

*Primary Examiner* — Nicolas A Arnett

(57) ABSTRACT

An inflator head, which is adapted to be mounted on a cylinder, includes a casing and an adjusting valve. The casing is mounted on the cylinder. The casing has an opening at a front end and a channel in communication with the opening of the casing and an outlet of the cylinder. The adjusting valve has one end axially inserted into the opening of the casing. The adjusting valve has an axial hole therein and at least one inlet defined in an outer periphery thereof and communicating with the axial hole. The adjusting valve is movable between an open position in which the inlet communicates with a chamber of the cylinder to inflate a tire, and a close position in which the inlet is blocked from communicating with the chamber of the cylinder.

7 Claims, 8 Drawing Sheets

TIRE INFLATOR

BACKGROUND OF THE INVENTION

1. Field of the Invention

The present invention relates to a tire inflator, and more particularly to a head assembly of a tire inflator.

2. Description of Related Art

Bicycle activity is more and more popular in these days because it is eco-friendly, convenient and entertaining. A bicycle pump is designed for inflating bicycle tires. Particularly, portable inflators are pumps carried on the bike, which are often fairly small to reduce weight. Because of their size, the volume of air that these pumps can provide is limited such that a lot of pumping may be needed. In order to solve this problem, modern gas inflators are often used by mountain bike or road bike racers who need to save weight, and to save time if they puncture during a race.

As shown in FIG. 8, a conventional inflator comprises a gas cylinder 7 and an inflator head 8 mounted to the gas cylinder 7. A pinhead 81 is disposed in between the gas cylinder 7 and the inflator head 8 for guiding the gas in the gas cylinder 7 escaped to the inflator head 8. A rubber ring 9 is disposed in an outlet of the inflator head 8 for sealing a tire valve while operating. However, the conventional inflator is generally a one-time pump which cannot be used repeatedly. Also, the conventional inflator fails to control the inflation gas.

The present invention has arisen to mitigate and/or obviate the disadvantages of the conventional inflator.

SUMMARY OF THE INVENTION

The main objective of the present invention is to provide an improved tire inflator.

To achieve the objective, an inflator head, which is adapted to be mounted on a cylinder of a tire inflator, comprises a casing to be connected to the cylinder, a ping head and an adjusting valve. The casing has an opening at a front end and a channel communicating with the opening of the casing. The pinhead is disposed in the casing and configured to seal an outlet of the cylinder. The pinhead has a passage in communication with a chamber of the cylinder and the channel of the casing when the cylinder is assembled with casing. The adjusting valve has one end axially inserted into the opening of the casing. The adjusting valve has an axial hole therein and at least one inlet defined in an outer periphery thereof and communicating with the axial hole. The adjusting valve is movable between an open position in which the inlet communicates with the chamber of the cylinder, and a close position in which the inlet is blocked from communicating with the chamber of the cylinder. Wherein, a spring is biased between a rear wall of the adjusting valve and a rear wall of the channel of the casing, and a regulator is configured to secure the rear wall of the adjusting valve to the rear wall of the channel of the casing while the adjusting valve is displaced relative to the regulator.

The inflator head further comprises a first gasket placed in between the pinhead and the cylinder, and a plurality of sealing rings mounted around an outer periphery of the adjusting valve, wherein the inlet is disposed between adjacent two of the sealing rings. The adjusting valve defines a head and a shank. The shank of the adjusting valve has a plurality of annular grooves at the outer periphery thereof for accommodating the sealing rings. A second gasket disposed in the axial hole at the head of the adjusting valve.

Specifically, the casing is substantially T-shaped, which defines a horizontal part and a vertical part integrally formed from the horizontal part. The opening is defined at a front end of the horizontal part, and the vertical part is adapted to be mounted on the cylinder. The regulator has a bolt and a sleeve mounted around the bolt. The bolt is axially connected to the rear wall of the channel of the casing to retain the adjusting valve in the channel of the casing. The bolt defines a head and a shank. The shank has an external thread at an outer periphery thereof opposite to the head. The casing further defines a recess in the rear wall of the channel and an inner thread defined in an inner periphery of the recess so that the bolt could be screwed in the recess of the casing for adjusting a distance between the rear wall of the adjusting valve and the rear wall of the channel of the casing.

Further benefits and advantages of the present invention will become apparent after a careful reading of the detailed description with appropriate reference to the accompanying drawings.

DETAILED DESCRIPTION OF THE INVENTION

Figure 1:
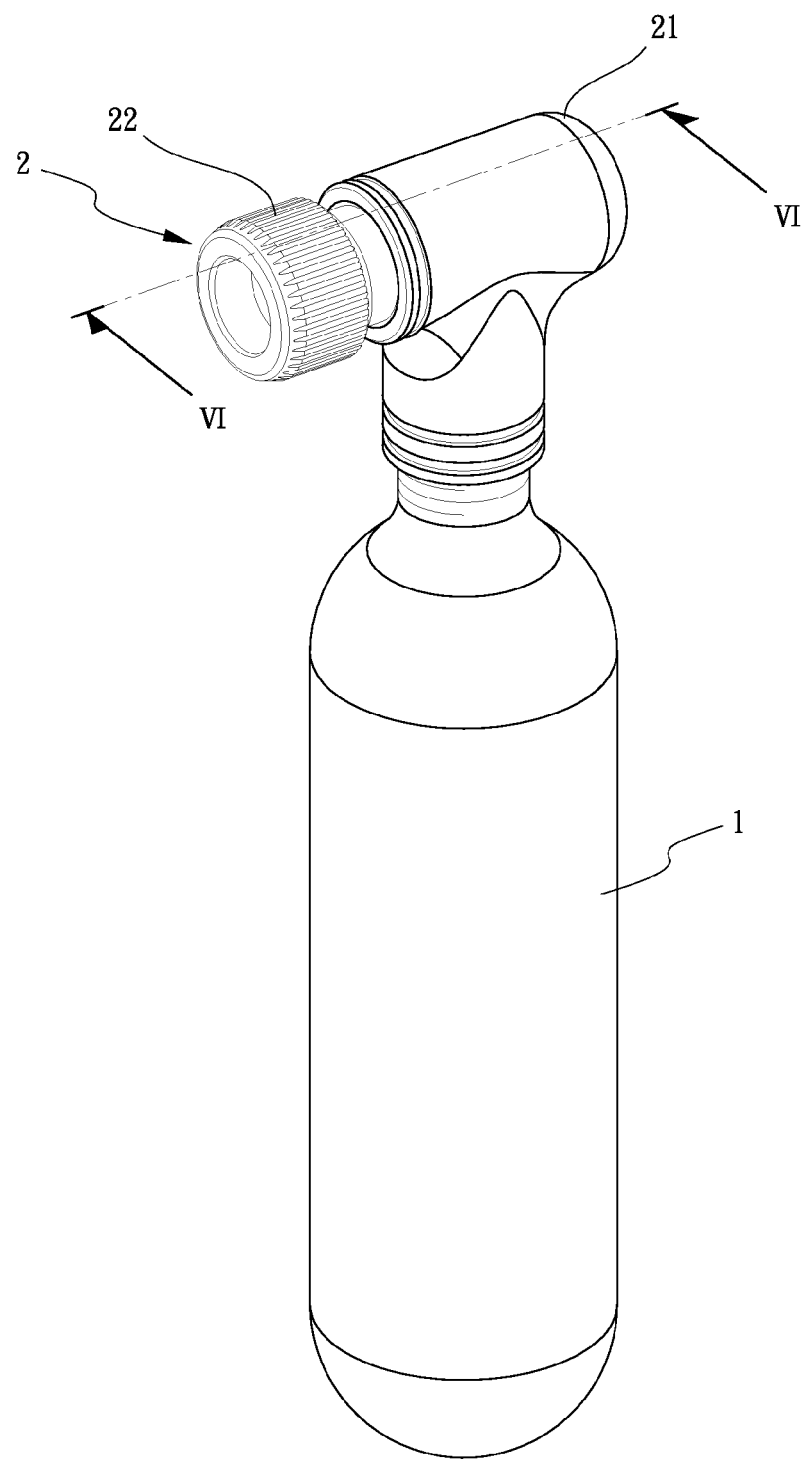
FIG. 1 is a perspective view of a tire inflator of the present invention.

Referring to FIGS. 1-5, an inflator head 2 in accordance with a preferred embodiment of the present invention, that is adapted to be mounted on a cylinder 1 of a tire inflator. The inflator head 2 comprises a casing 21, an adjusting valve 22 and a pinhead 25. The casing 21 is configured to be connected to the cylinder 1 with a lower end, which has an opening 211 at a front end and a channel 212 communicating with the opening 211 of the casing 21. The pinhead 25 is disposed in the casing 21 and configured to seal an outlet 12 of the cylinder 1. The pinhead 25 has a passage 251 in communication with a chamber 11 of the cylinder 1 and the channel 212 of the casing 21 when the cylinder 1 is assembled with casing 21.

Figure 4:
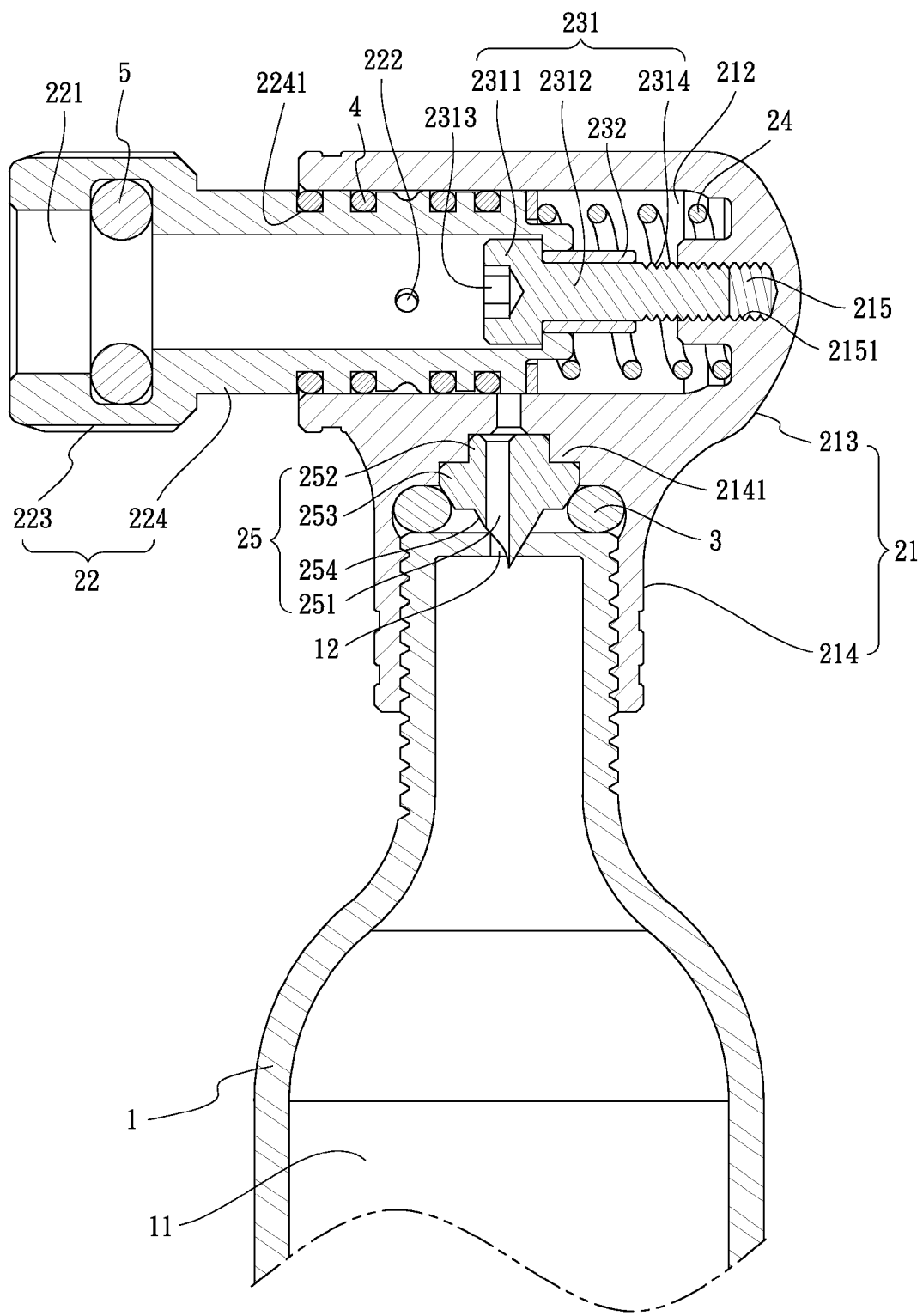
FIGS. 4-5 illustrate an operation of the tire inflator of the present invention.
Figure 5:
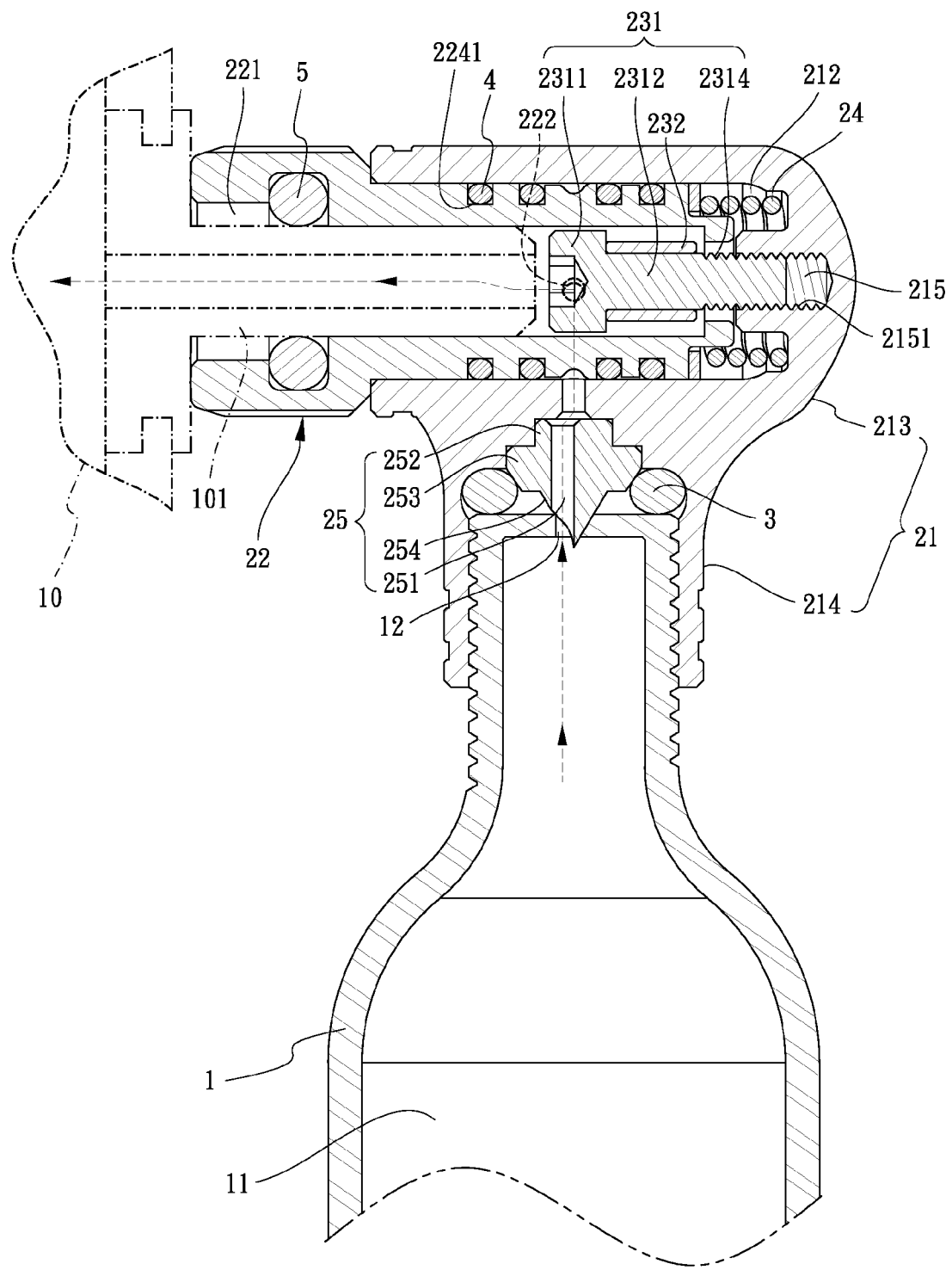

Referring to FIGS. 4-5, the adjusting valve 22 has one end axially inserted into the opening 211 of the casing 21, wherein the adjusting valve 22 is movable relative to the casing 21. The adjusting valve 22 has an axial hole 221 therein and at least one inlet 222 defined in an outer periphery thereof and communicating with the axial hole 221. Specifically, the adjusting valve 22 is movable between an open position in which the inlet 222 communicates with the chamber 11 of the cylinder 1, as shown in FIG. 5, and a close position in which the inlet 222 is blocked from communicating with the chamber 11 of the cylinder 1, as shown in FIG. 4.

Figure 2:
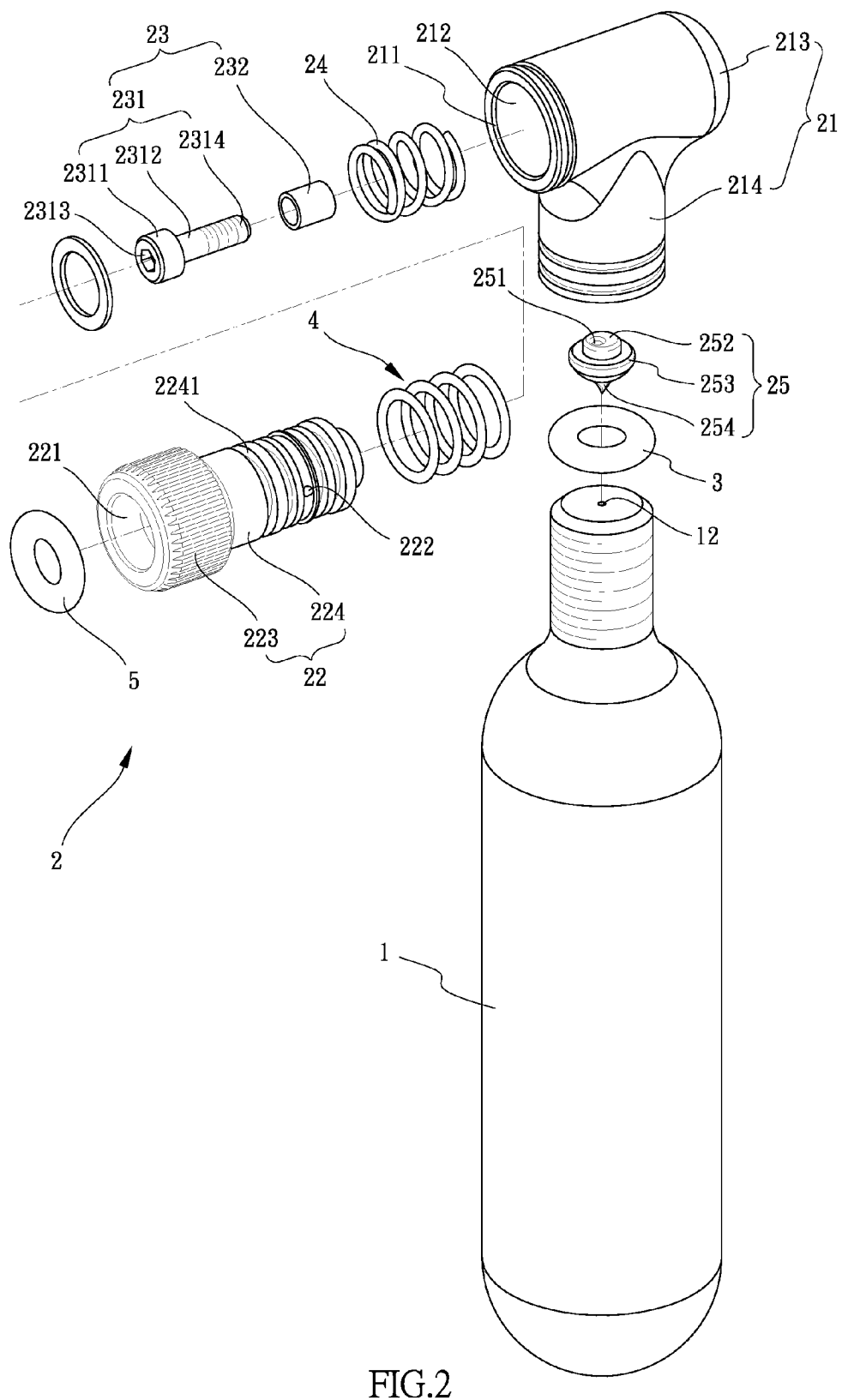
FIG. 2 is an exploded perspective view of the tire inflator in FIG. 1.

As shown in FIG. 4 and referring to FIG. 2, a spring 24 is biased between a rear wall of the adjusting valve 22 and a rear wall of the channel 212 of the casing 21; and a regulator 23 is configured to secure the rear wall of the adjusting valve 22 to the rear wall of the channel 212 of the casing 21 while the adjusting valve 22 is displaced relative to the regulator 23.

Therefore, the adjusting valve 22 could be pushed to the open position and moved back to the close position via a recovery force of the spring 24.

Figure 3:
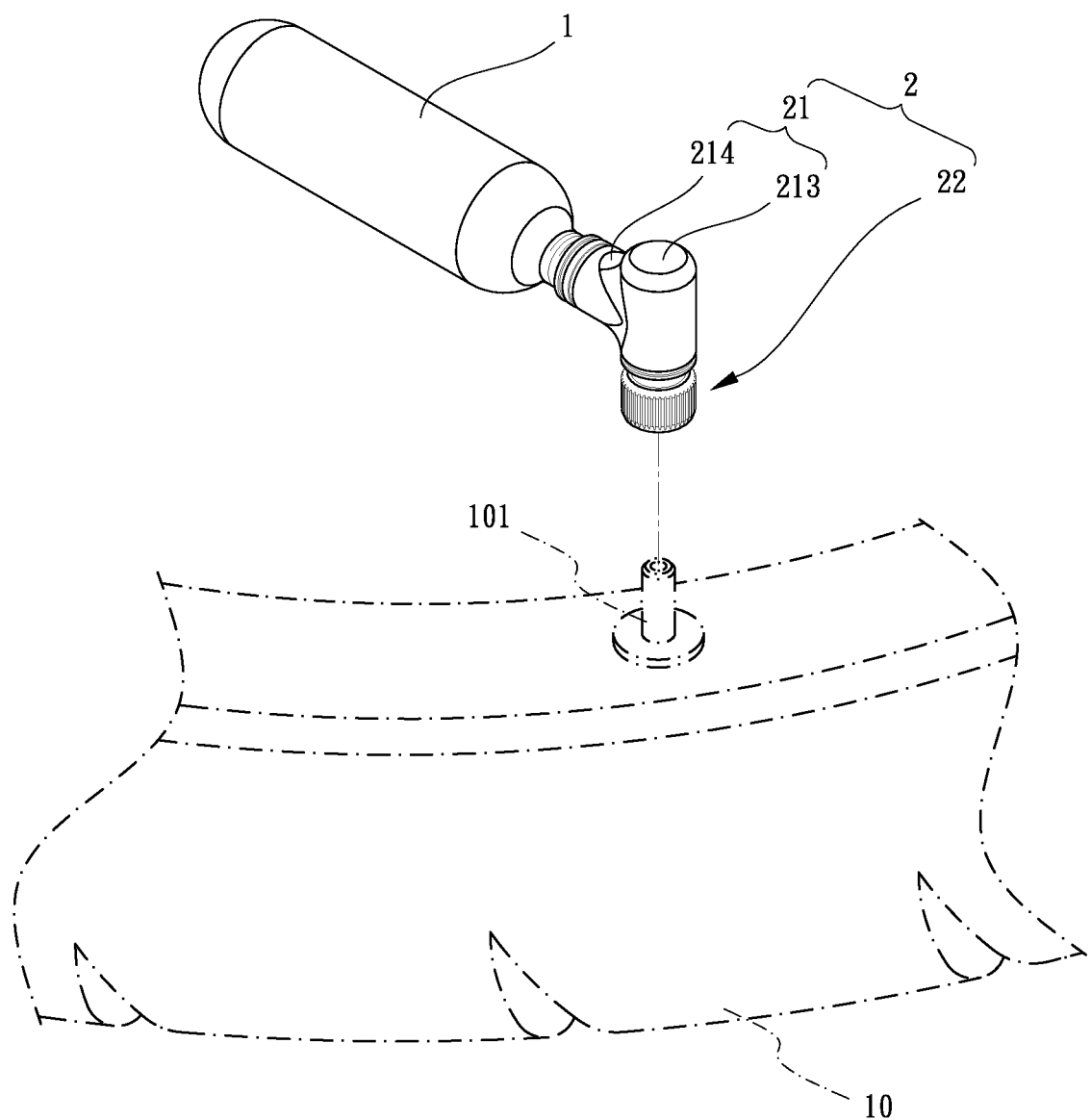
FIG. 3 illustrates that the tire inflator in FIG. 1 is provided to inflate a tire.

As shown in FIGS. 3-5, the inflator is provided to inflate a tire 10 while the inflator head 2 is configured to be connected with a tire valve 101. In operation, when the adjusting valve 22 is pushed to the open position, the gas in the chamber 11 of the cylinder 1 is escaped through the passage of the pinhead 25, the inlet 222 and the axial hole 221 of the adjusting valve 22 to pump the tire 10. In contrast, when the inflator head 2 is withdrawn from the tire valve 101, the adjusting valve 22 is back to the close position by the spring 24.

As shown in FIG. 2 and FIG. 4, the casing 21 is substantially T-shaped, which defines a horizontal part 213 and a vertical part 214 integrally formed from the horizontal part 213. The opening 211 is defined at a front end of the horizontal part 213 and the vertical part 214 is adapted to be mounted on the cylinder 1. Furthermore, a first gasket 3 is placed in between the pinhead 25 and the cylinder 1, and a plurality of sealing rings 4 are mounted around an outer periphery of the adjusting valve 22 for sealing, wherein the inlet 222 is disposed between adjacent two of the sealing rings 4. Specifically, the adjusting valve 22 defines a head 223 and a shank 224. The shank 224 of the adjusting valve 22 has a plurality of annular grooves 2241 at the outer periphery thereof for accommodating the sealing rings 4. Moreover, a second gasket 5 is disposed in the axial hole 221 at the head 223 of the adjusting valve 22 for sealing the tire valve 101, as shown in FIG. 5.

As shown in FIG. 4 and Referring to FIG. 2, the pinhead 25 has a plug portion 252, a tip portion 254 and a convex ring 253 defined between the plug portion 252 and the tip portion 254. The passage 251 is defined in the pinhead 25 through the plug portion 252, the convex ring 253 and the tip portion 254. The vertical part 214 of the casing 21 has a shoulder portion 2141 defined in an inner periphery of the channel 212. Therefore, the plug portion 252 is inserted in the shoulder portion 2141 and the convex ring 253 abuts against the shoulder portion 2141 so that the pinhead 25 could be positioned in the vertical part 214 of the casing 21. Specifically, the tip portion 254 of the pinhead 25 is configured to insert into the outlet 12 of the cylinder 1 for guiding the gas in the chamber 11 of the cylinder 1 escaped through the passage of the pinhead 25. Wherein, the first gasket 3 is placed in between the convex ring 253 of the pinhead 25 and the cylinder 1 for sealing.

Figure 6:
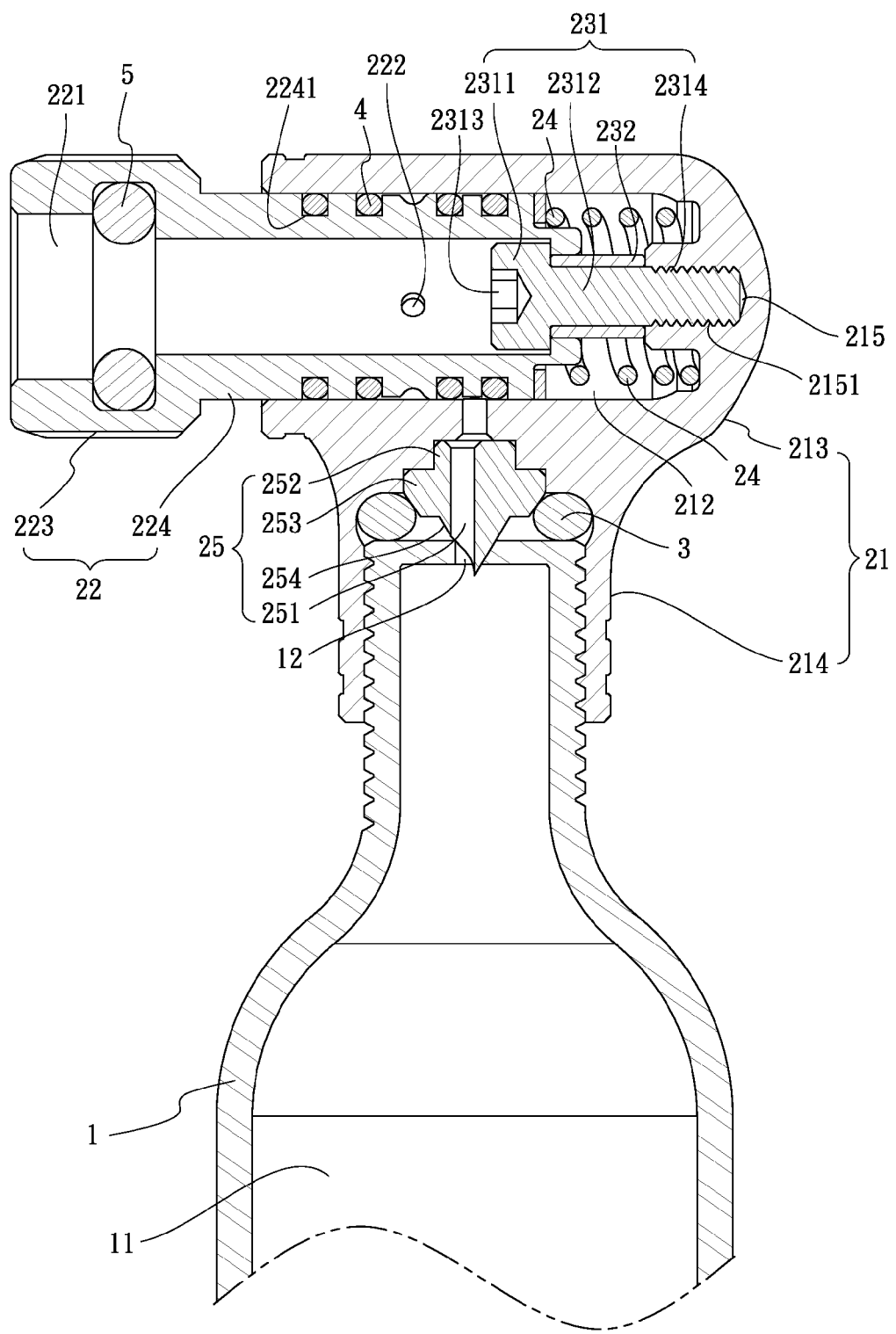
FIGS. 6-7 illustrate, the operation of the tire inflator of the present invention while a bolt is adjusted relative to a casing.
Figure 7:
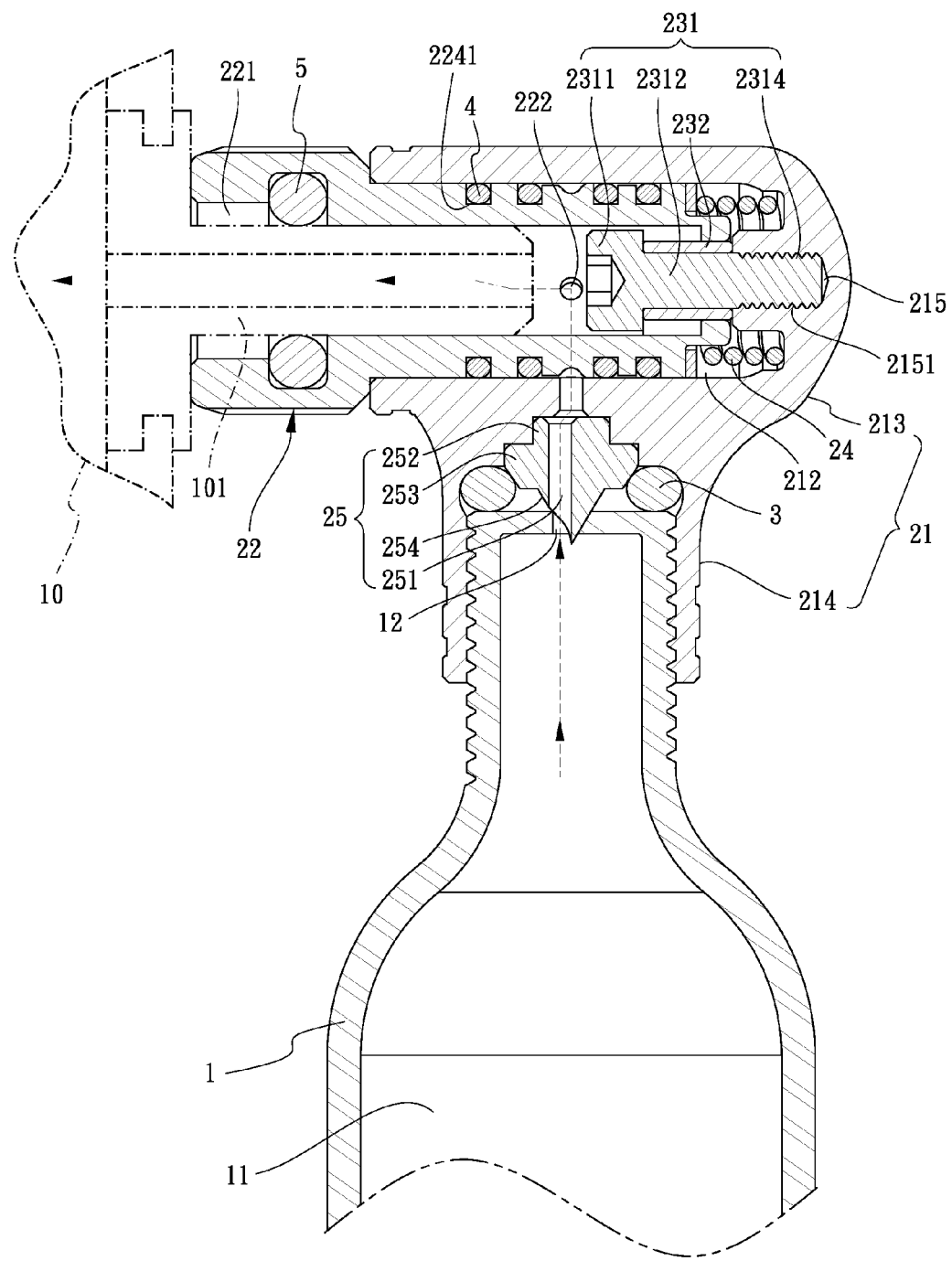
Figure 8:
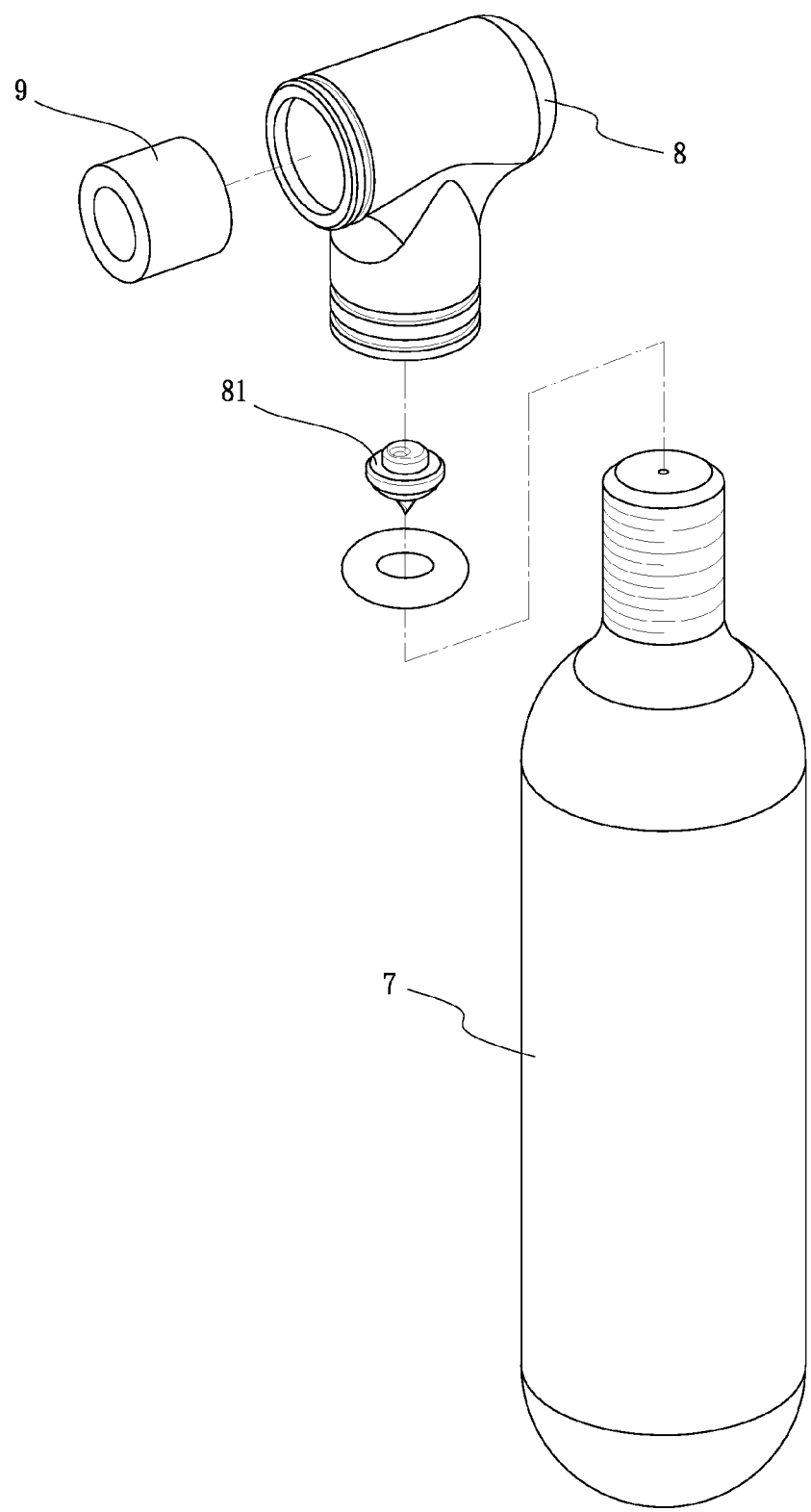
FIG. 8 is a prior art.

Furthermore, the regulator 23 has a bolt 231 and a sleeve 232 mounted around the bolt 231. The bolt 231 is axially connected to the rear wall of the channel 212 of the casing 21 to retain the adjusting valve 22 in the channel 212 of the casing 21. Particularly, the bolt 231 defines a head 2311 and a shank 2312. The head 2311 defines a polygonal recess 2313 to be operated. The shank 2312 has an external thread 2314 at an outer periphery thereof opposite to the head 2311. The casing 21 further defines a recess 215 in the rear wall of the channel 212 and an inner thread 2151 defined in an inner periphery of the recess 215 so that the bolt 231 could be screwed in the recess 215 of the casing 21 for adjusting a distance between the rear wall of the adjusting valve 22 and the rear wall of the channel 212 of the casing 21, as shown in FIGS. 6-7.

Although embodiments of this invention have been fully described with reference to the accompanying drawings, it is to be understood that various modifications can be made by those skilled in the art without departing from the scope of the invention as hereinafter claimed.

What is claimed is:

1. An inflator head, which is adapted to be mounted on a cylinder of a tire inflator, comprising:
    a casing to be connected to the cylinder with a lower end, the casing having an opening at a front end and a channel communicating with the opening of the casing;
    a pinhead disposed in the casing and being configured to seal an outlet of the cylinder, the pinhead having a passage in communication with a chamber of the cylinder and the channel of the casing when the cylinder is assembled with casing;
    an adjusting valve having one end axially inserted into the opening of the casing, the adjusting valve having an axial hole therein and at least one inlet defined in an outer periphery thereof and communicating with the axial hole, the adjusting valve being movable between an open position in which the inlet communicates with the chamber of the cylinder, and a close position in which the inlet is blocked from communicating with the chamber of the cylinder;
    a spring biased between a rear wall of the adjusting valve and a rear wall of the channel of the casing; and
    a regulator configured to secure the rear wall of the adjusting valve to the rear wall of the channel of the casing while the adjusting valve is displaced relative to the regulator.

2. The inflator head as claimed in claim 1, wherein the casing is substantially T-shaped, which defines a horizontal part and a vertical part integrally formed from the horizontal part; the opening is defined at a front end of the horizontal part; and the vertical part is adapted to be mounted on the cylinder.

3. The inflator head as claimed in claim 1 further comprising a first gasket placed in between the pinhead and the cylinder, and a plurality of sealing rings mounted around an outer periphery of the adjusting valve, wherein the inlet is disposed between adjacent two of the sealing rings.

4. The inflator head as claimed in claim 3, wherein the adjusting valve defines a head and a shank; the shank of the adjusting valve has a plurality of annular grooves at the outer periphery thereof for accommodating the sealing rings.

5. The inflator head as claimed in claim 4 further comprising a second, gasket disposed in the axial hole at the head of the adjusting valve.

6. The inflator head as claimed in claim 1, wherein the regulator has a bolt and a sleeve mounted around the bolt; the bolt is axially connected to the rear wall of the channel of the casing to retain the adjusting valve in the channel of the casing.

7. The inflator head as claimed in claim 6, wherein the bolt defines a head and a shank; the shank has an external thread at an outer periphery thereof opposite to the head; and the casing further defines a recess in the rear wall of the channel and an inner thread defined in an inner periphery of the recess so that the bolt could be screwed in the recess of the casing for adjusting a distance between the rear wall of the adjusting valve and the rear wall of the channel of the casing.

\* \* \* \* \*